(12) United States Patent
Petridi

(10) Patent No.: US 9,572,023 B2
(45) Date of Patent: Feb. 14, 2017

(54) METHOD AND SYSTEM FOR PROVIDING SERVICES TO MOBILE COMMUNICATION SUBSCRIBERS

(76) Inventor: Ivan Alexandrovich Petridi, Chelyabinsk (RU)

(*) Notice: Subject to any disclaimer, the term of this patent is extended or adjusted under 35 U.S.C. 154(b) by 219 days.

(21) Appl. No.: 14/351,754

(22) PCT Filed: Jun. 22, 2012

(86) PCT No.: PCT/RU2012/000486
§ 371 (c)(1),
(2), (4) Date: Jul. 28, 2014

(87) PCT Pub. No.: WO2013/055255
PCT Pub. Date: Apr. 18, 2013

(65) Prior Publication Data
US 2014/0335829 A1 Nov. 13, 2014

(30) Foreign Application Priority Data
Oct. 12, 2011 (RU) ................. 2011141313

(51) Int. Cl.
*H04M 1/66* (2006.01)
*H04M 1/68* (2006.01)
(Continued)

(52) U.S. Cl.
CPC ............ *H04W 8/26* (2013.01); *H04L 9/14* (2013.01); *H04W 12/04* (2013.01); *H04W 12/06* (2013.01);
(Continued)

(58) Field of Classification Search
CPC .......... H04W 4/003; H04W 4/02; H04W 8/04; H04W 8/18; H04W 8/205; H04W 8/245; H04W 8/26; H04W 12/02; H04W 12/04; H04W 12/06; H04W 12/08; H04W 12/12; H04W 24/02; H04W 48/08; H04W 48/16; H04W 48/18; H04W 60/00; H04W 60/005; H04W 64/00; H04W 76/02; H04W 76/025; H04W 84/042; H04W 88/06; H04W 88/18
(Continued)

(56) References Cited

U.S. PATENT DOCUMENTS 9,253,588 B2 * 2/2016 Schmidt ............... H04W 8/265
2005/0124288 A1 * 6/2005 Karmi ................. H04L 12/5692
455/3.01
(Continued)

FOREIGN PATENT DOCUMENTS

EP 1055338 B2 11/2009
RU 2295200 C2 3/2007
(Continued)

OTHER PUBLICATIONS

International Search Report and Written Opinion dated Nov. 9, 2012 corresponding to International Patent Application No. PCT/RU2012/000486 and English translation thereof.

*Primary Examiner* — Rafael Pérez-Gutiérrez
*Assistant Examiner* — Mark G. Pannell
(74) *Attorney, Agent, or Firm* — Squire Patton Boggs (US) LLP (57) ABSTRACT

The present invention is related to a method and system for service provision to mobile communication subscribers with the use of so-called virtual SIM cards and is also related to respective machine-readable media. A technical result of the invention is expansion of an arsenal of technical communication options and better security of operations with virtual SIM cards.

6 Claims, 8 Drawing Sheets

(51) Int. Cl.

| | |
|---|---|
| *H04M 3/16* | (2006.01) |
| *H04M 1/00* | (2006.01) |
| *H04B 1/38* | (2015.01) |
| *H04W 8/26* | (2009.01) |
| *H04W 12/06* | (2009.01) |
| *H04L 9/14* | (2006.01) |
| *H04W 60/00* | (2009.01) |
| *H04W 12/08* | (2009.01) |
| *H04W 12/04* | (2009.01) |
| *H04W 8/20* | (2009.01) |
| *H04L 29/06* | (2006.01) |
| *H04W 12/02* | (2009.01) |

(52) U.S. Cl.
CPC ............ *H04W 12/08* (2013.01); *H04W 60/00* (2013.01); *H04L 63/0442* (2013.01); *H04L 2209/24* (2013.01); *H04W 8/205* (2013.01); *H04W 12/02* (2013.01)

(58) Field of Classification Search
USPC .................. 455/410, 411, 414.1, 418, 432.1, 432.3,455/433, 435.1, 435.2, 436, 445, 456.1–456.3,455/550.1, 552.1, 558
See application file for complete search history.

(56) References Cited

U.S. PATENT DOCUMENTS

| | | | |
|---|---|---|---|
| 2009/0077643 A1* | 3/2009 | Schmidt ................ | H04W 8/265 726/6 |
| 2009/0125996 A1* | 5/2009 | Guccione ............ | H04L 63/0853 726/6 |
| 2010/0210304 A1* | 8/2010 | Huslak .................. | G06Q 10/10 455/558 |
| 2010/0311402 A1* | 12/2010 | Srinivasan ............ | H04W 8/183 455/418 |
| 2010/0311468 A1* | 12/2010 | Shi ........................ | H04W 4/003 455/558 |
| 2012/0047227 A1* | 2/2012 | Haggerty ............... | G06Q 30/06 709/217 |
| 2012/0108294 A1* | 5/2012 | Kaul .................... | G06K 7/0013 455/558 |
| 2012/0196569 A1* | 8/2012 | Holtmanns ......... | H04L 63/0428 455/411 |

FOREIGN PATENT DOCUMENTS

| | | |
|---|---|---|
| RU | 2406267 C2 | 12/2010 |
| WO | WO 2006/094564 A1 | 9/2006 |

* cited by examiner

METHOD AND SYSTEM FOR PROVIDING SERVICES TO MOBILE COMMUNICATION SUBSCRIBERS

FIELD OF THE INVENTION

The present invention is related to the method and system for service provision to mobile communication subscribers with the use of so-called virtual SIM cards and also to respective machine-readable media.

TECHNICAL LEVEL

Recently so called virtual SIM cards have became increasingly used in the mobile communication technique, when authentication data of the mobile device are stored at the distant center and are delivered by request.

For instance, Application for a USP No 2010/0210304 (published on Aug. 19, 2010) discloses systems and methods for wireless management of SIM cards of multiple devices, when the database of virtual SIM cards keeps a great number of persons (for the user). This document proposes to save the data of virtual SIM card in the basic (i.e. physical) SIM card of the cell phone. For this purpose cellular networks shall be modified so that they "understand" the signals from virtual SIM card servers and consider the virtual card as authorized on behalf of the basic SIM card but with substitution of the cell phone number. Such proposed upgrading of existing cellular networks seems to be as essential fault of said innovation.

International Application No WO 2008/040964 published on Apr. 10, 2008, describes subscriber's identities for mobile communication network, when the single mobile device has basic SIM card coupled with virtual SIM cards. This document proposes always couple virtual SIM card with basic medium, and this is considered as serious limitation.

Technical decision described in international Application No WO 2006/094564 published on Sep. 14, 2006, is the closest to the present invention. This document describes the method of redirection of mobile phone service, where the server stores a great number of SIM cards, and the device built in the mobile phone emulates virtual SIM card, which is communicated from this server. The limitation of this technical decision is that SIM cards are stored in the server physically rather than in the form of information, and transmission of the virtual SIM card implies transmission of its image, "impression" rather than information about SIM card. And the protection of such transmission from unauthorized actions is not dealt at all.

DISCLOSURE OF THE INVENTION

Therefore the present invention is aimed on development of the method and system for service provision to mobile communication subscribers, which would overcome the deficiencies of known technical decisions in addition to expansion of arsenal of technical communication means.

To solve the problem in the first inventive subject matter of the present invention the method of service provision to mobile communication subscribers is proposed, consisting in formation of regional subscribers' databases for storing the data about SIM cards intended for physical or virtual provision to the subscribers; registration of subscriber's identity assigned to each SIM card of this region in respective subscriber's database; formation of authentication database for storing the data about SIM cards available in this region in conjunction with above mentioned regional subscribers' database; addition of the registered subscriber's identity of each SIM card and individual identity key of that SIM card to the first container, with container content encrypted by asymmetric encryption; formation of service database to store the virtual SIM cards; saving the encrypted first container for each SIM card stored in authentication database as virtual SIM card in the service database; provision of the physical SIM card registered in the regional subscriber's database to new subscriber during the registration procedure; at request of the service by the registered subscriber through his mobile device with physical SIM card the information on the region of said SIM card is analyzed by the subscriber's identity by local base station of mobile communication network; if the region of local base station matches with the region of concerned SIM card the SIM card is used for provision of the requested service; if the region of local base station does not match with the region of concerned SIM card, respective virtual SIM card is requested from above mentioned service database; virtual SIM card of this subscriber, additionally encrypted by the second asymmetric encryption with the use of individual key, which is saved in respective physical SIM card, is transmitted from the service database; the data of transmitted virtual SIM card are decrypted with the use of individual identity key to predetermined memory space in the mentioned mobile device; decoded data of decrypted virtual SIM card are used at the subscriber's request through the mobile device for the provision of interesting service.

Specific aspect of the method according to this invention is that the request of virtual SIM card in the service database leads to: the search of respective first container by the received identity of physical SIM card; decryption of the found first container and extraction of authentication data about physical SIM card from the first container into the second container; encryption of the contents of the second container by the second asymmetric encryption with the use of individual key contained in the extracted authentication data; transmission of the second container with its public key into the mobile device as a virtual SIM card intended for operation in the region, where that mobile device is situated.

To solve the same problem in the second inventive subject matter of the present invention the system for service provision to mobile communication subscribers is proposed, consisting in: regional subscribers' databases for storing the data about SIM cards intended for physical or virtual provision to the subscribers and for registration of subscriber's identity assigned to each SIM card of this region; authentication database, which was formed in conjunction with above mentioned regional subscribers' database and intended for storing the data about SIM cards available in this region and for addition of the registered subscriber's identity of each SIM card and of individual identity key of that SIM card to the first container, with the container content encrypted by asymmetric encryption; service database intended for storing the encrypted first container for each SIM card from authentication database as a virtual SIM card, and for interaction with mobile device containing certain physical SIM card; with the following steps implemented during interaction process in the event of request through the mobile device: if the region of local base station matches with the region of concerned SIM card the SIM card is used for provision of the requested service; if the region of local base station does not match with the region of concerned SIM card, respective virtual SIM card is requested from the service database; virtual SIM card of this subscriber, additionally encrypted by the second asymmetric encryption with the use of individual key, which is saved in respective physical SIM card, is transmitted from the service database; the data of transmitted virtual SIM card are decrypted with the use of individual identity key to predetermined memory space in the mobile device; decoded data of decrypted virtual SIM card are used at the subscriber's request through the mobile device for the provision of interesting service.

Specific aspect of the system according to this invention is that service database is configured to provide the following steps at the request of virtual SIM card: the search of respective first container by the received identity of physical SIM card; decryption of the found first container and extraction of authentication data about physical SIM card from the first container into the second container; encryption of the contents of the second container by the second asymmetric encryption with the use of individual key contained in the extracted authentication data; transmission of the second container with its public key into the mobile device as a virtual SIM card intended for operation in the region, where that mobile device is situated.

To solve the same problem in the third inventive subject matter of the present invention the machine-readable medium is proposed; said medium is intended for direct involvement in operation of the mobile device in the method according to the first inventive subject matter of the present invention, and contains software program, which provides for implementation of the following steps when executed in the mobile device: at request of the service by the registered subscriber through the mobile device with physical SIM card, if the analysis of information about the region of the concerned SIM cards by its subscriber's identity in the local base station in the mobile communication network shows that the region of the local base station matches with the region of the concerned SIM card, then SIM card is used for provision of the requested service; at request of the service by the registered subscriber through the mobile device with physical SIM card, if the analysis of information about the region of the concerned SIM cards by its subscriber's identity in the local base station in the mobile communication network shows that the region of the local base station does not match with the region of the concerned SIM card, then respective virtual SIM card in the service database is requested; virtual SIM card of this subscriber, additionally encrypted by the second asymmetric encryption with the use of individual key, which is saved in respective physical SIM card, is transmitted from the service database; after reception of virtual SIM card transmitted from the service database by the mobile device the data about transmitted virtual SIM card are decrypted with the use of individual identity key to predetermined memory space in the mobile device; decoded data of decrypted virtual SIM card are used at the subscriber's request through the mobile device for the provision of interesting service.

To solve the same problem in the fourth inventive subject matter of the present invention the machine-readable medium is proposed; said medium is intended for direct involvement in operation of the service database in the method according to the first inventive subject matter of the present invention, and contains software program, which provides for implementation of the following steps when executed in the service database, if the region of the local base station does not match with the region of the concerned SIM card and request for the respective virtual SIM card in the service database: search of respective first container by the received identity of physical SIM card; decryption of the found first container and extraction of authentication data about physical SIM card from the first container; encryption of the contents of the second container by the second asymmetric encryption with the use of individual key contained in the extracted authentication data; transmission of the second container with its public key into the mobile device as a virtual SIM card intended for operation in the region, where that mobile device is situated.

DETAILED DESCRIPTION OF THE INVENTION

The method for service provision to mobile communication subscribers according to the present invention can be embodied with the use of system for service provision to mobile communication subscribers, which is illustrated in enclosed drawings.

The method according to the present invention provides for formation of regional subscribers' databases for storing the data about SIM cards intended for physical or virtual provision to subscribers. These databases may be formed in advance or being formed for the first time.

Formed subscribers' databases are intended for storing the data about SIM cards and also for registration of the subscriber's identity assigned to each SIM card of given region. At the present time International Mobile Subscriber Identity (IMSI) is used as such subscriber's identity; however, any other identity intended for distinguishing one mobile network subscriber from another can serve as such.

The regional subscriber's database is formed in conjunction with the authentication database for storing the data about SIM cards available in this region.

Figure 1:
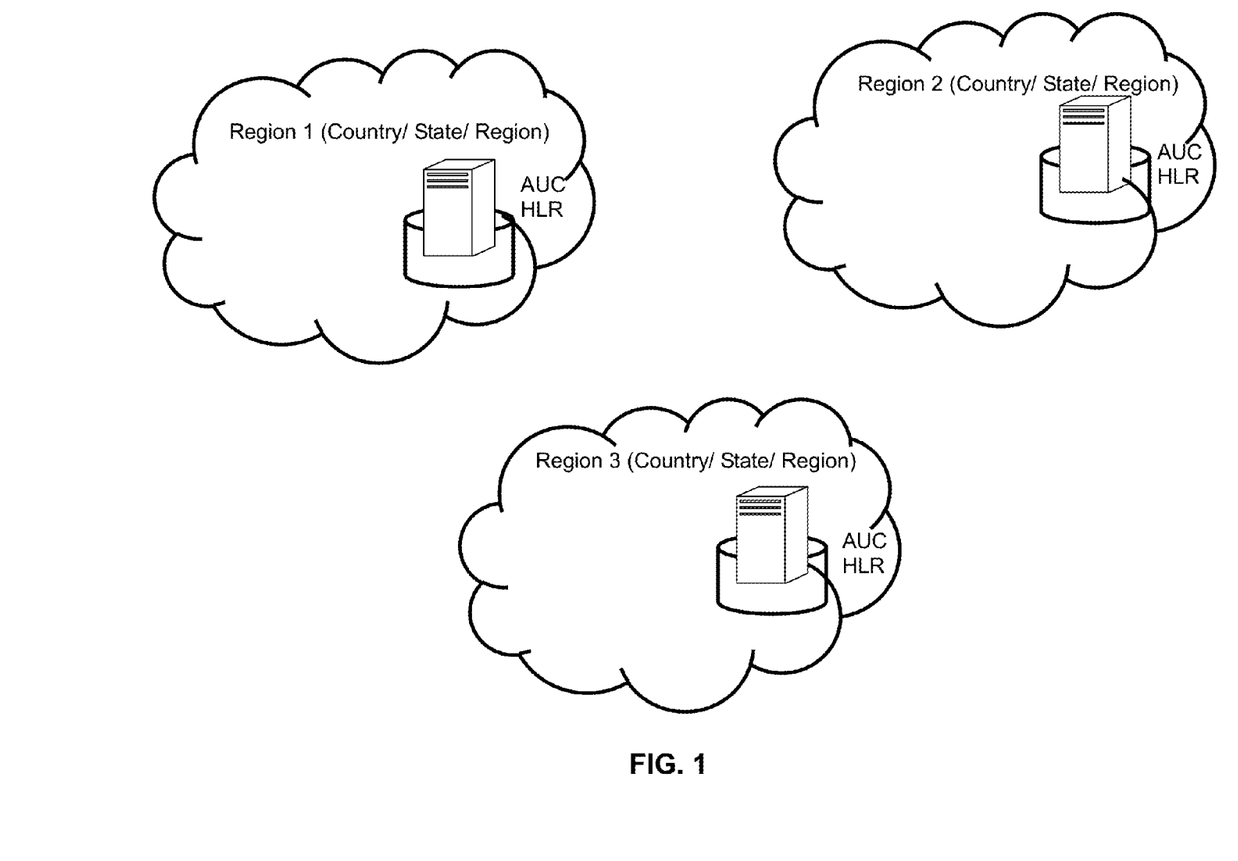
FIG. 1. Regional subscriber's database with authentication databases.

For the purpose of the document, the result of the described operations following the method according to the present invention is illustrated in FIG. 1, where regional subscribers' databases are shown, and each of them comprises at least the database of network subscribers of GSM operator (Home Location Register, HLR) Authentication Centre (AUC), responsible for authentication of each SIM card, which attempts to connect with GSM network (usually, when the mobile handset is switched on). These subscriber's databases can be stored at respective servers in each region, where mobile communications is expected or already exist.

Figure 2:
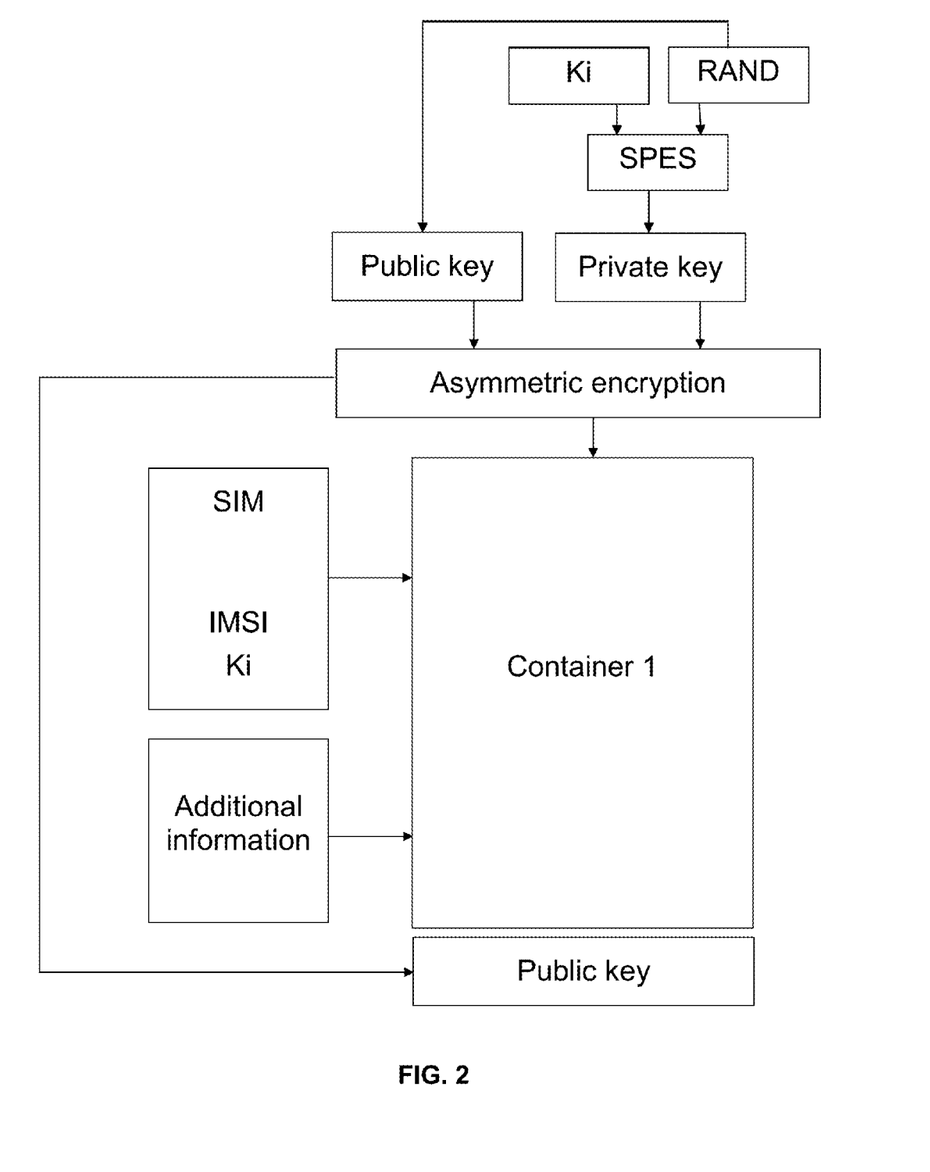
FIG. 2. Control flow chart of the first container encryption.

Registered subscriber's identity (hereinafter, IMSI) of each SIM card and individual identity key (hereinafter, Ki) of this SIM card are added to the first container, with container content encrypted by asymmetric encryption. This is illustrated in FIG. 2, where asymmetric encryption is implemented by selection of random number (RAND) for public key and by formation of private key with the use of individual key Ki and selected random number by algorithm A3 (SRES) or ay other algorithm known to those skilled in the art.

Figure 3:
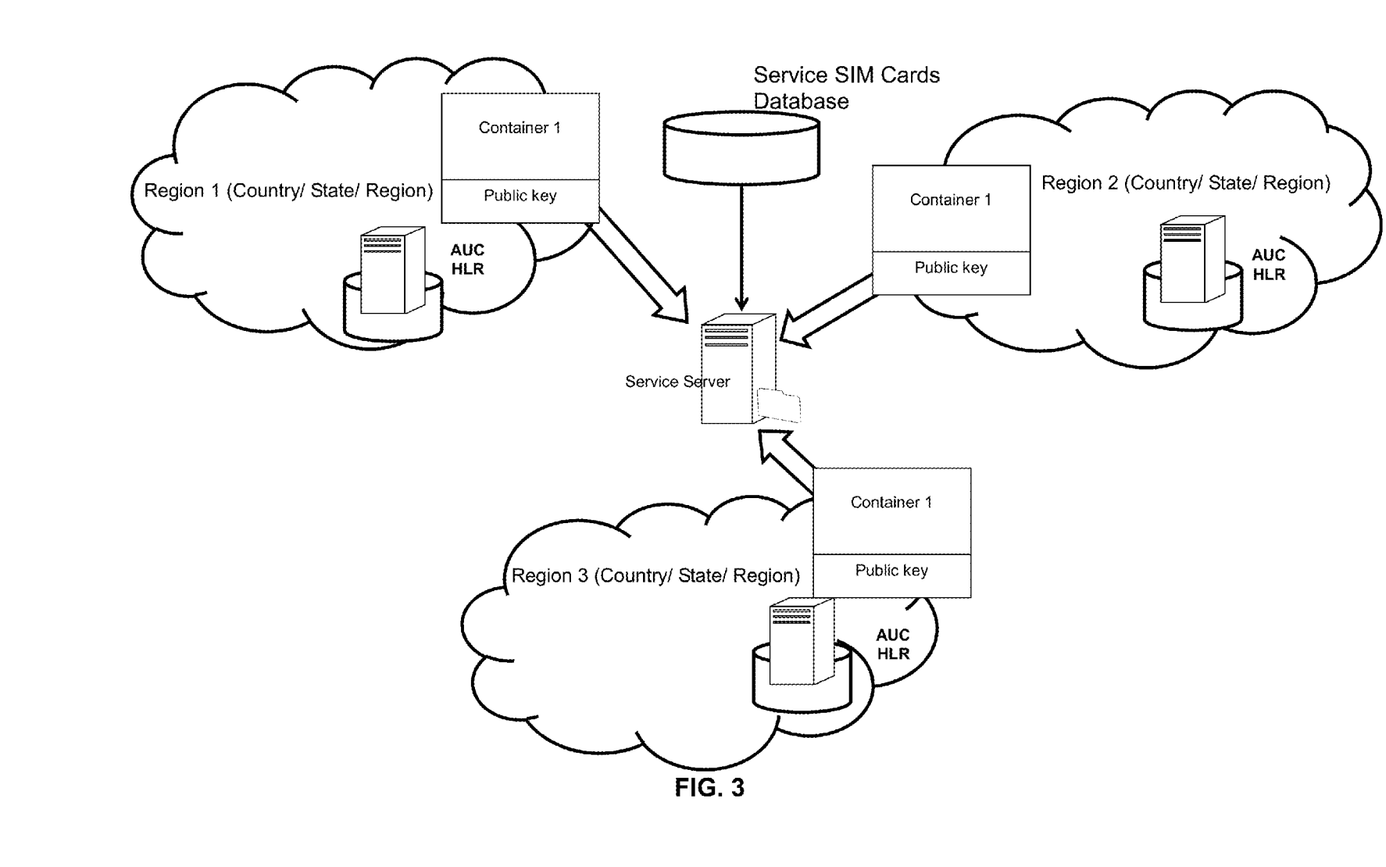
FIG. 3. Pattern of interaction between the components of the system according to the present invention when the virtual SIM cards are saved.

According to the method disclosed in the present invention, the service database for storing virtual SIM cards is formed. In this service database encrypted first container for each SIM card from authentication database is saved as a virtual SIMI card. It is clear that each encrypted container is saved with its public key. This is illustrated in FIG. 3. Subsequently, authentication database is used for interaction with mobile device, containing specific physical SIM card.

Figure 4:
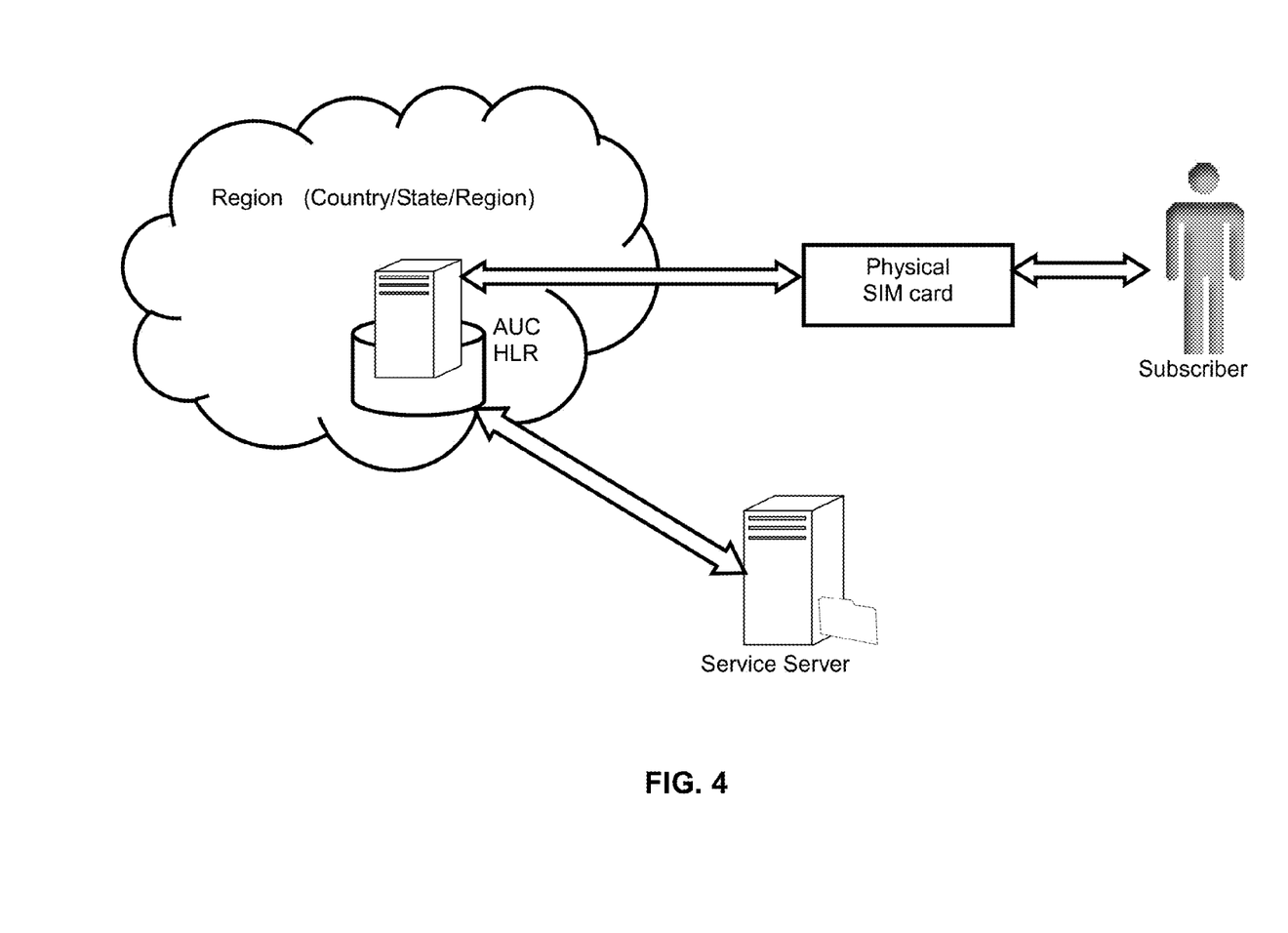
FIG. 4. Pattern of interaction between the components of the system according to the present invention when the subscriber is registered.

At registration each new subscriber is provided with physical SIM card registered in the regional subscriber's database. This is shown in FIG. 4.

Figure 5:
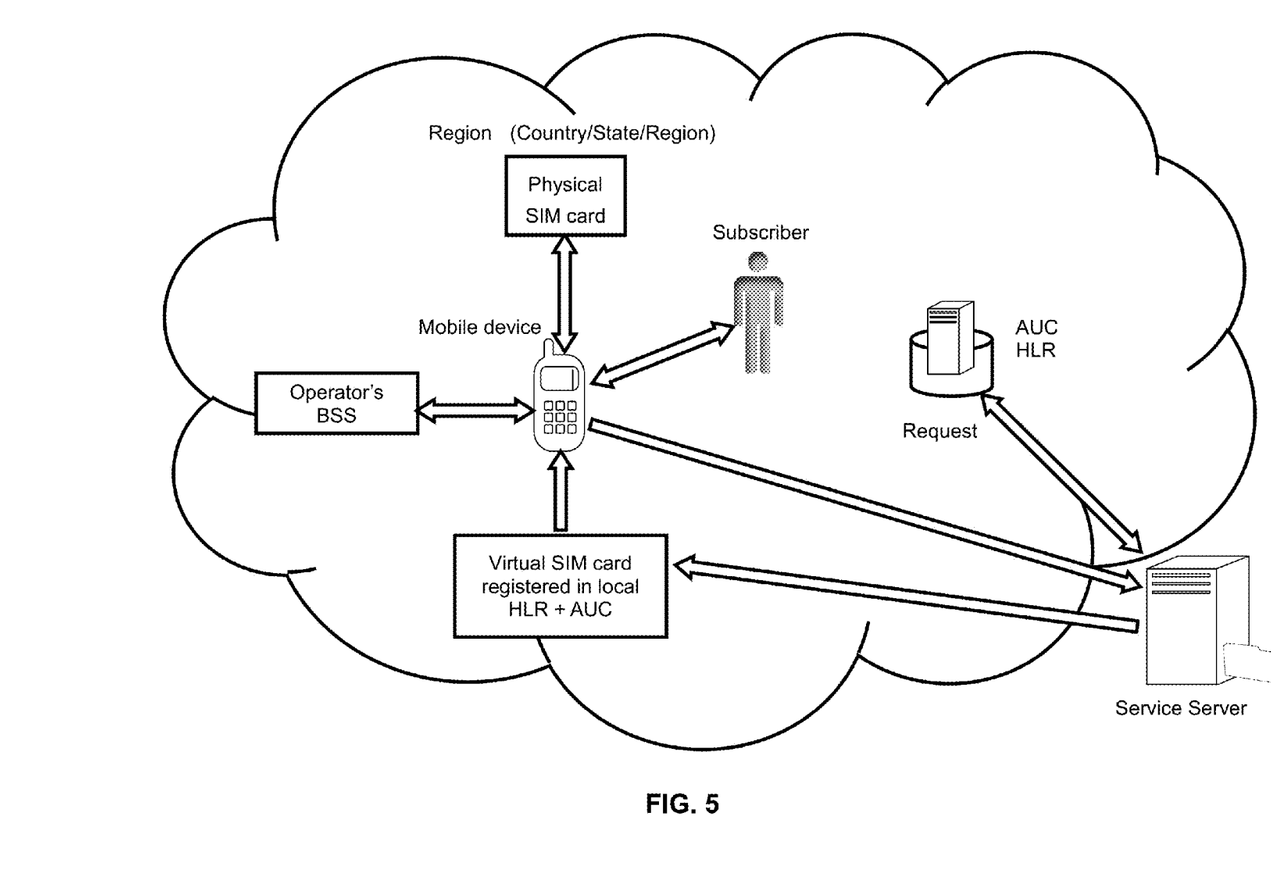
FIG. 5 and FIG. 6. Pattern of interaction between the components of the system according to the present invention when the registered subscriber requests a service.

When registered subscriber requests the service through his mobile device with physical SIM card local base station (BSS) in the mobile communication network analyzes the information about the region of this SIM card by its subscriber's identity. If the region of local base station matches with the region of concerned SIM card the SIM card is used for provision of the requested service; if the region of local base station does not match with the region of concerned SIM card, respective virtual SIM card is requested from the service database. These operations are illustrated in FIG. 5.

Figure 6:
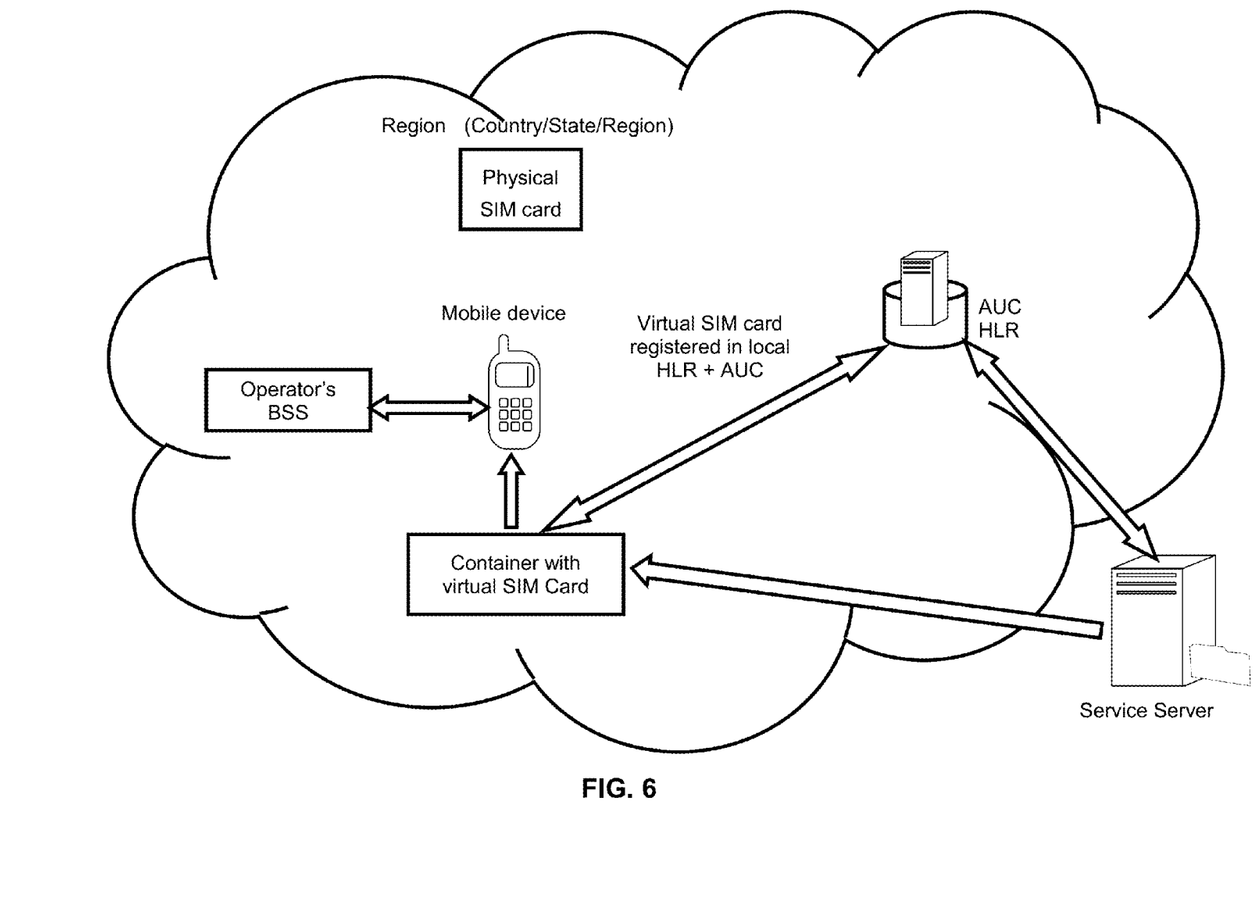

In the event of database query the virtual SIM card of the concerned subscriber after additional encryption by the second asymmetric encryption with the use of individual key Ki saved in respective physical SIM card is transmitted in the second container from this service database. After reception of transmitted virtual SIM card the data are decrypted in the mobile device with the use of individual identity key Ki to predetermined memory space in the mobile device. Both space in SIM card and independent onboard flash-memory in the handset can serve as such memory space. Obviously, other technical decisions can be used for implementation of predetermined memory space. Decoded data of encrypted virtual SIM card are used for access with request through mobile device for provision of the interesting service to the subscriber. These operations are illustrated in FIG. 6.

Figure 7:
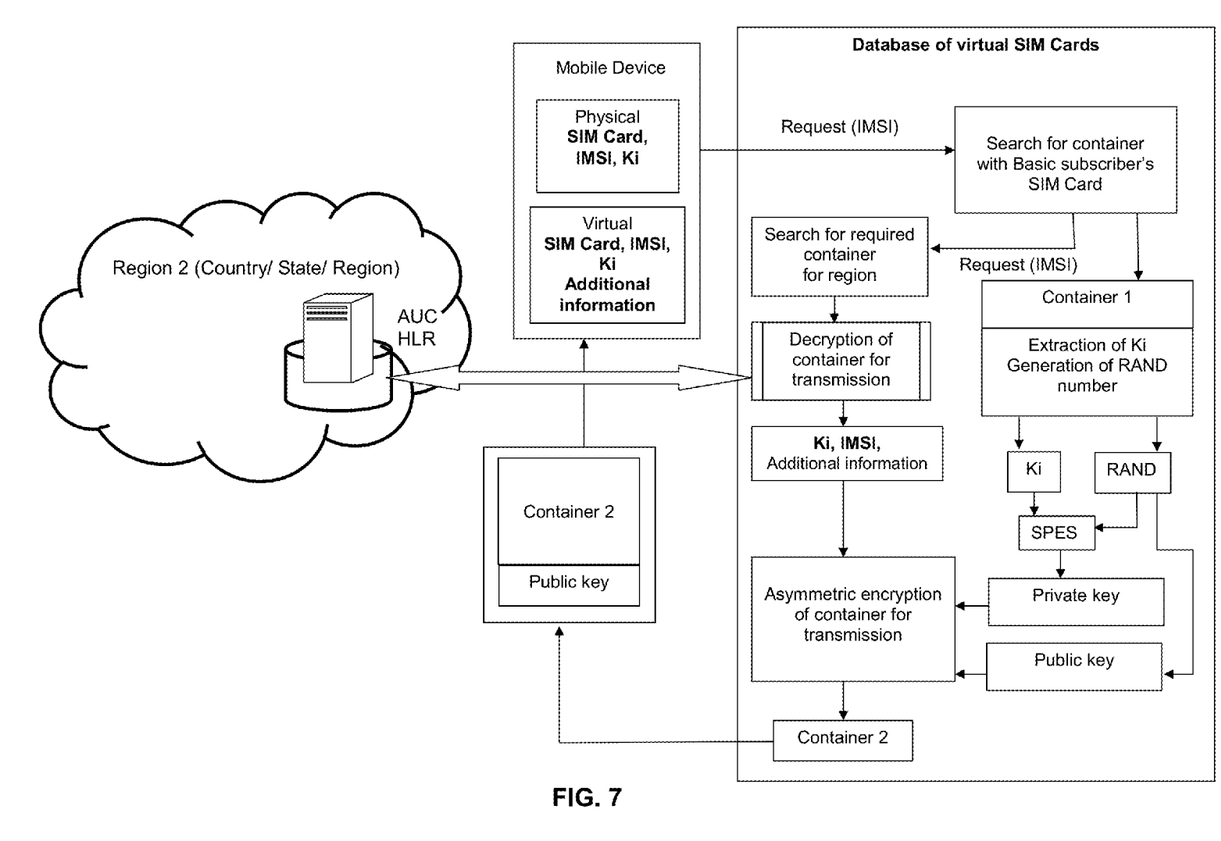
FIG. 7. Control flow chart of the second container encryption.

At request of virtual SIM card the following operations are implemented in the service database. Respective first container is searched by received physical SIM card identity. Found first container is decrypted with extraction of authentication data about above mentioned physical SIM card into the second container, with the second container contents encrypted by the second asymmetric encryption different from above mentioned first asymmetric encryption, with the use of individual key Ki, which is contained in extracted authentication information. The second container with its public key is transmitted into mobile device as a virtual SIM card, which is intended for operation in the region where this mobile device is situated. These operations are illustrated in FIG. 7.

Figure 8:
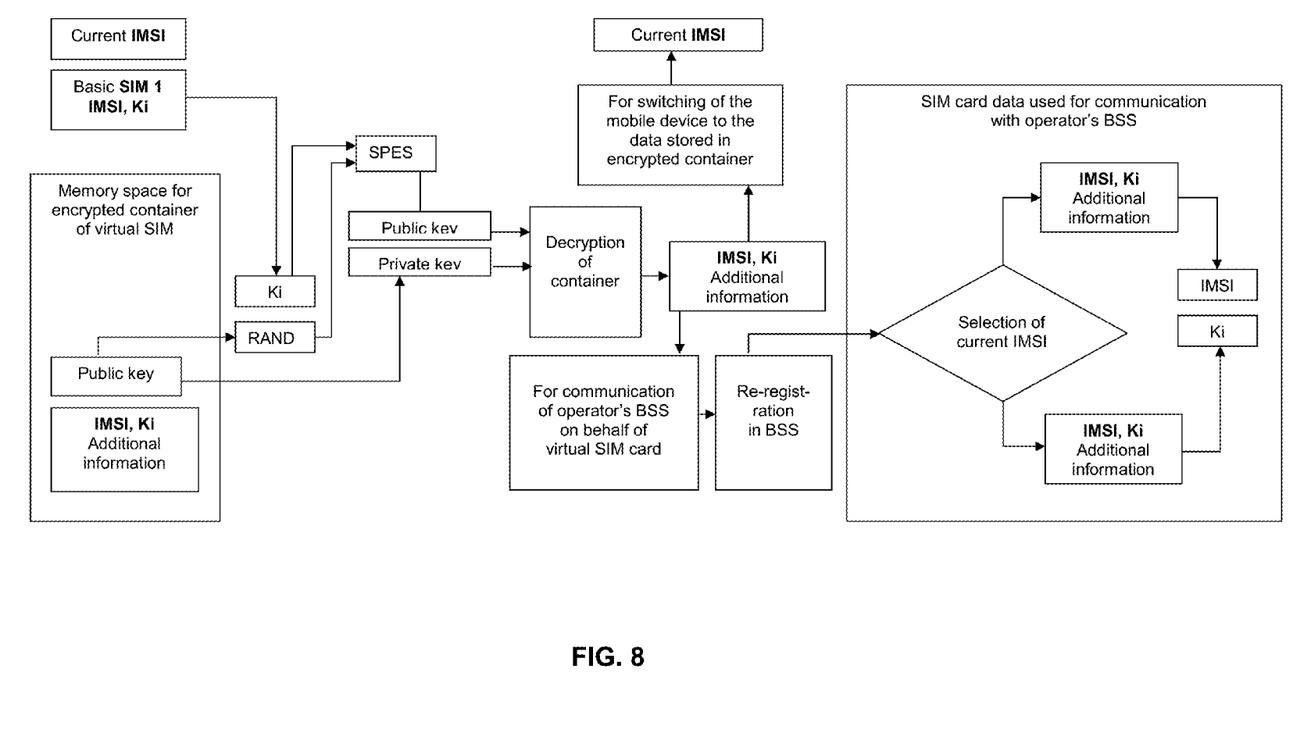
FIG. 8. General pattern of interaction between the components of the proposed system.

FIG. 8 illustrates general pattern of interaction between the components of the proposed system.

These components can be implemented with the use of technical means individually known for those skilled in the art and described, in particular, in above mentioned analogous solutions.

At the same time, the operations in the mobile handset and in the service database in accordance with the method disclosed in this invention can be implemented with the use of software programs stored in respective machine-readable media.

For instance, the mobile device can use machine-readable medium containing software program, which provides for implementation of the following steps when executed in this mobile device:

at request of the service by the registered subscriber through the mobile device with physical SIM card, if the analysis of information about the region of the concerned SIM cards by its subscriber's identity in the local base station in the mobile communication network shows that the region of the local base station matches with the region of the concerned SIM card that SIM card is used for provision of the requested service;

at request of the service by the registered subscriber through the mobile device with physical SIM card, if the analysis of information about the region of the concerned SIM cards by its subscriber's identity in the local base station in the mobile communication network shows that the region of the local base station does not match with the region of the concerned SIM card, then respective virtual SIM card in the service database is requested;

virtual SIM card of this subscriber, additionally encrypted by the second asymmetric encryption with the use of individual key Ki, which is saved in respective physical SIM card, is transmitted from the service database;

after reception of virtual SIM card transmitted from the service database by the mobile device the data about transmitted virtual SIM card are decrypted with the use of individual identity key Ki to predetermined memory space in the mobile device;

decoded data of decrypted virtual SIM card are used at the subscriber's request through the mobile device for the provision of interesting service.

The service database may operate with the use of machine-readable medium containing software program, which provides implementation of the following steps when executed in the service database, if the region of the local base station does not match with the region of the concerned SIM card and the respective virtual SIM card in the service database:

search for respective first container by the received identity of physical SIM card;

decryption of the found first container and extraction of authentication data about physical SIM card from the first container into the second container;

encryption of the contents of the second container by the second asymmetric encryption with the use of individual key Ki contained in the extracted authentication data;

transmission of the second container with its public key into the mobile device as a virtual SIM card intended for operation in the region, where that mobile device is situated.

Therefore, the present invention provides expansion of arsenal of technical communication means and enables to overcome the deficiencies of existing technical level in the area of service provision to mobile communication subscribers with the use of virtual SIM cards.

The invention claimed is:

1. A method for service provision to mobile communication subscribers comprising:

forming a regional subscribers' database for storing data about SIM cards intended for physical or virtual provision to subscribers;

registering a subscriber's identity assigned to each SIM card of a given region in the respective subscribers' database;

forming an authentication database for storing the data about SIM cards available in the given region in conjunction with the regional subscribers' database;

adding the registered subscriber's identity of each SIM card and an individual identity key of that SIM card into a first container, with content of the first container encrypted by asymmetric encryption;

forming a service database to store virtual SIM cards;

saving the encrypted first container for each SIM card from the authentication database as a virtual SIM card in the service database;

providing a physical SIM card registered in the regional subscribers' database to a new subscriber during a registration procedure;

in response to a request for the service by the registered subscriber through a mobile device of the registered subscriber with the physical SIM card, information on a region of said SIM card is analyzed using the subscriber's identity by a local base station of a mobile communication network;

if a region of the local base station matches with the region of the SIM card, the SIM card is used for provision of the requested service;

if the region of local base station does not match with the region of the SIM card, a virtual SIM card corresponding to the SIM card is requested from the service database;

the virtual SIM card of the subscriber, additionally encrypted by a second asymmetric encryption with the use of an individual key, which is saved in the physical SIM card, is transmitted from the service database;

data of the transmitted virtual SIM card are decrypted with the use of the individual identity key to predetermined memory space in the mobile device;

decoded data of a decrypted virtual SIM card are used at the subscriber's request through the mobile device for the provision of the requested service.

2. Method according to claim 1, wherein the request for virtual SIM card in the service database is followed by:

searching for a first container using the received identity of the physical SIM card;

decrypting the found first container and extracting authentication data about the physical SIM card from the found first container into a second container having a public key;

encrypting contents of the second container by the second asymmetric encryption with the use of the individual key contained in the extracted authentication data;

transmitting the second container with its public key into the mobile device as a virtual SIM card intended for operation in a region where the mobile device is situated.

3. System for service provision to mobile communication subscribers comprising:

a regional subscribers' database for storing data about SIM cards intended for physical or virtual provision to the subscribers and for registration of a subscriber's identity assigned to each SIM card of a given region:

an authentication database, which was formed in conjunction with the regional subscribers' database and intended for storing data about SIM cards available in the given region and for addition of the registered subscriber's identity of each SIM card and of an individual identity key of that SIM card to a first container, with content of the first container encrypted by asymmetric encryption;

a service database intended for storing the encrypted first container for each SIM card from the authentication database as a virtual SIM card, and for interaction with a mobile device containing a physical SIM card;

wherein the system is configured to perform the following steps during the interaction process in the event of a request through the mobile device:

if a region of a local base station matches with a region of the SIM card, the SIM card is used for provision of the requested service;

if the region of local base station does not match with the region of the SIM card, a virtual SIM card corresponding to the SIM card is requested from the service database;

the virtual SIM card of the subscriber, additionally encrypted by a second asymmetric encryption with the use of an individual key, which is saved in the respective physical SIM card, is transmitted from the service database;

data of the transmitted virtual SIM card are decrypted with the use of the individual identity key into predetermined memory space in the mobile device;

decoded data of decrypted virtual SIM card are used at the subscriber's request through the mobile device for the provision of the requested service.

4. The system according to claim 3, wherein the service database is configured to provide the following steps at the request of the virtual SIM card:

searching for a first container using the received identity of the physical SIM card;

decrypting the found first container and extracting authentication data about the physical SIM card from the found first container into a second container having a public key;

encrypting contents of the second container by the second asymmetric encryption with the use of the individual key contained in the extracted authentication data;

transmitting the second container with its public key into the mobile device as a virtual SIM card intended for operation in a region where the mobile device is situated.

5. Non-transitory machine-readable medium, intended for direct involvement in operation of the mobile device in the method according to claim 1 and containing a software program, which provides for implementation of the following steps when executed in the mobile device:

in response to the request for the service by the registered subscriber through the mobile device with the physical SIM card, if the analysis of information about the region of the SIM card by its subscriber's identity in the local base station in the mobile communication network shows that the region of the local base station matches with the region of the SIM card, then the SIM card is used for provision of the requested service;

in response to the request for the service by the registered subscriber through the mobile device with the physical SIM card, if the analysis of information about the region of the SIM card by its subscriber's identity in the local base station in the mobile communication network shows that the region of the local base station does not match with the region of the SIM card, then a virtual SIM card corresponding to the SIM card in the service database is requested;

the virtual SIM card of the subscriber, additionally encrypted by the second asymmetric encryption with the use of the individual key, which is saved in respective physical SIM card, is transmitted from the service database;

after reception of the virtual SIM card transmitted from the service database by the mobile device, the data about the transmitted virtual SIM card are decrypted with the use of the individual identity key to predetermined memory space in the mobile device;

decoded data of the decrypted virtual SIM card are used at the subscriber's request through the mobile device for the provision of the requested service.

6. Non-transitory machine-readable medium, intended for direct involvement in operation of the service database according to claim 1 and containing a software program, which provides for implementation of the following steps when executed in the service database:

searching for a first container using the received identity of the physical SIM card;

decrypting the found first container and extracting authentication data about the physical SIM card from the found first container into a second container having a public key;

encrypting contents of the second container by the second asymmetric encryption with the use of the individual key contained in the extracted authentication data;

transmitting the second container with its public key into the mobile device as a virtual SIM card intended for operation in a region where the mobile device is situated.

* * * * *